United States Patent [19]

Ward

[11] Patent Number: 4,488,154
[45] Date of Patent: Dec. 11, 1984

[54] RADAR PROCESSOR

[75] Inventor: Harold R. Ward, Bedford, Mass.

[73] Assignee: Raytheon Company, Lexington, Mass.

[21] Appl. No.: 361,668

[22] Filed: Mar. 25, 1982

Related U.S. Application Data

[63] Continuation of Ser. No. 143,569, Apr. 25, 1980, abandoned.

[51] Int. Cl.³ ............................................. G01S 13/52
[52] U.S. Cl. .................................. 343/9 R; 343/5 CF;
343/5 NQ; 343/7.7; 343/17.1 R; 364/517
[58] Field of Search ............... 364/517, 582, 581, 724;
343/5 VQ, 7 A, 7 HL, 7.7, 5 DP, 17.2, 5 NQ,
5 CF, 17.1 R, 9 R; 455/303, 306, 307

[56] References Cited

U.S. PATENT DOCUMENTS

| | | | |
|---|---|---|---|
| 3,404,399 | 10/1968 | Eschner, Jr. .......................... | 343/7.7 |
| 3,706,990 | 12/1972 | Carre ..................................... | 343/7.7 |
| 3,721,978 | 3/1973 | Doggett, Jr. ......................... | 343/7 A |
| 3,769,611 | 10/1973 | Scaggs .................................. | 455/306 |
| 3,962,704 | 6/1976 | Evans ................................... | 343/7.7 |
| 3,988,679 | 10/1976 | Clarke et al. ........................ | 455/306 |
| 3,993,994 | 11/1976 | Goggins .............................. | 364/517 |
| 4,117,538 | 9/1978 | Shrader et al. ..................... | 364/517 |
| 4,121,295 | 10/1978 | Witt ..................................... | 364/724 |
| 4,132,990 | 1/1979 | DiDomizio et al. ................. | 343/7.7 |
| 4,206,463 | 6/1980 | Glasgow ............................. | 343/7.7 |
| 4,242,682 | 12/1980 | Musha et al. ....................... | 343/7.7 |

FOREIGN PATENT DOCUMENTS

| | | |
|---|---|---|
| 1091868 | 11/1967 | United Kingdom . |
| 1092209 | 11/1967 | United Kingdom . |
| 1144456 | 5/1969 | United Kingdom . |
| 1192290 | 5/1970 | United Kingdom . |
| 1312945 | 4/1973 | United Kingdom . |
| 1362785 | 8/1974 | United Kingdom . |
| 1522181 | 8/1978 | United Kingdom . |
| 2044034 | 10/1980 | United Kingdom . |
| 1583829 | 2/1981 | United Kingdom . |

OTHER PUBLICATIONS

Steinberg; Proc. Soc. Photo–*Opt. Instr. Eng.;* "Signal Processor Design for Quantum–Noise–Limited Target/Background Discrimination"; 1980; pp. 94–103.

*Primary Examiner*—Errol A. Krass
*Assistant Examiner*—Clifford L. Tager
*Attorney, Agent, or Firm*—Walter F. Dawson; Richard M. Sharkansky; Joseph D. Pannone

[57] ABSTRACT

A moving target indicator system in which quadrature components of each range cell of returned target reflections are produced by phase comparison with the transmitted signals and compared by weighting three successive returns to obtain moving target differences for display.

15 Claims, 3 Drawing Figures

RADAR PROCESSOR

CROSS REFERENCE TO RELATED CASES

This is a continuation of application Ser. No. 143,569, filed Apr. 25, 1980, abandoned.

BACKGROUND OF THE INVENTION

Moving target indicator systems have generally required the processing of signals from several successive sweeps to produce sufficient indications of differences between moving targets particularly at low velocities. Alternatively, expedience such as utilizing weighting factors or weighting received echo signals as a function of range disclosed in U.S. Pat. No. 4,117,538 by Shrader et al summing composite video signals from present range sweeps and predictions of composite videos of such range sweeps have been used with digital techniques for improving moving target indicating systems.

SUMMARY OF THE INVENTION

In accordance with this invention it is provided that a moving target indicator system wherein sequences of digital words derived from received signals which are phase related to a reference signal are weighted with coefficients which are functions of target velocities. Sums of the weighted sequences may then be displayed.

More specifically, in accordance with this invention a transmitter transmits pulses at any desired repetition rate and produces a reference signal which preserves the phase coherence of the transmitted signals. Received echo signals from targets are sampled for succeeding time periods following the transmitted signal to produce signals whose phase is compared with the phase reference and digitized outputs are produced and stored for succeeding transmitted pulses which due to rotation of a directional antenna transmitting the pulses produce slightly different echo signals. Signals from the same range or time delay from the transmitted signal, for three successive transmitted pulses are extracted from the storage means or directly from the receiver to be summed with appropriate weighting. The output of the summing system is then displayed on a display synchronized with the transmitted pulses to produce any desired display such as a plan position indicator. This invention further discloses rejection of clutter returns which are larger than a predetermined threshold for each of the outputs from the summer corresponding to a velocity channel. This invention further provides for rejecting all signals as the comparison of the sum of the squares of the in-phase and quadrature phase components of a range sample when the magnitude is substantially different from such a sum for the same range of a second interpulse system.

This invention further provides for storing a sequence of summed outputs of the different velocity channels during the final interpulse period of a three interpulse period group and outputting said sequence a plurality of times for display by a radar display more than once for each interpulse.

BRIEF DESCRIPTION OF THE DRAWINGS

Other and further embodiments of the invention will become apparent as the description thereof progresses, reference being had to the accompanying drawings wherein.

DESCRIPTION OF THE PREFERRED EMBODIMENT

Figure 1:
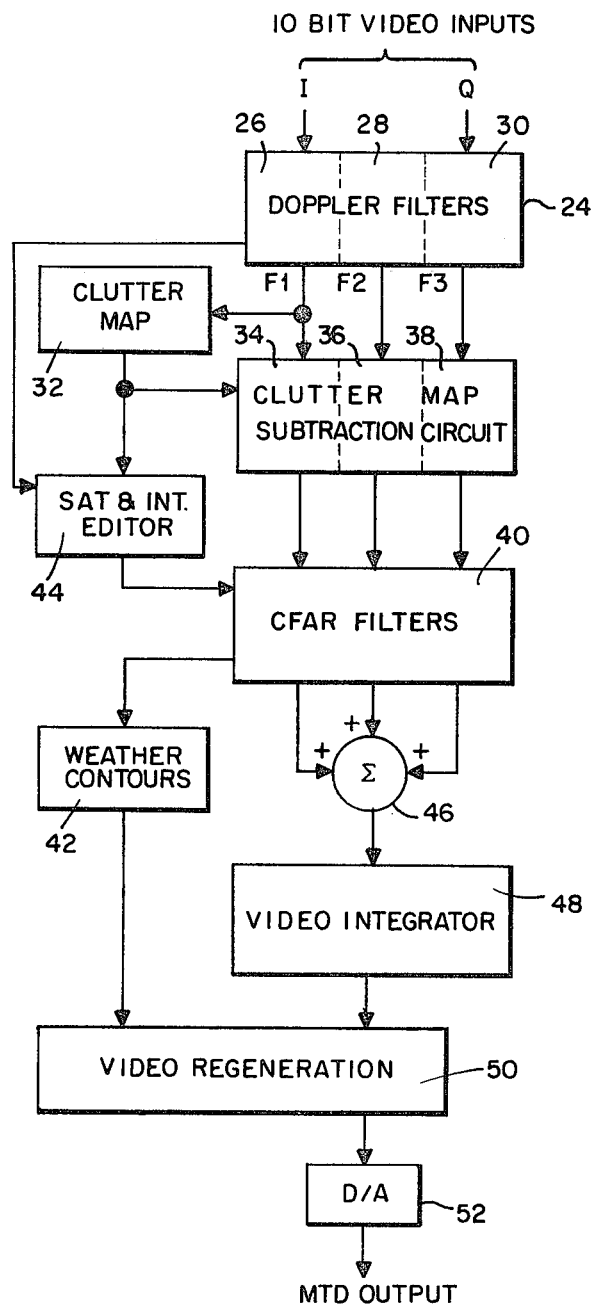
FIG. 1 illustrates a multi-filter processor embodying the invention.
Figure 2:
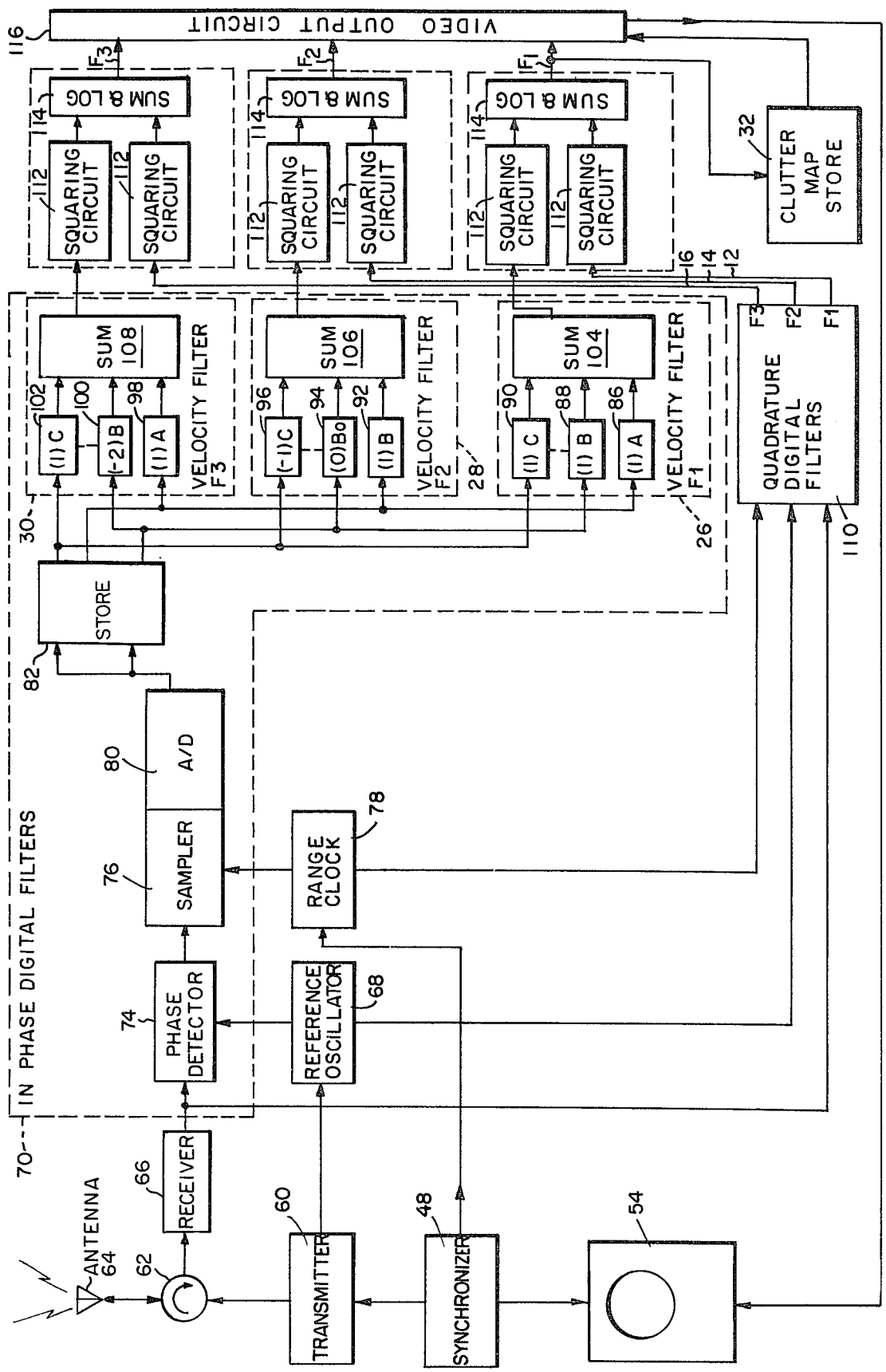
FIG. 2 illustrates a radar system embodying the processor of FIG. 1.
Figure 3:
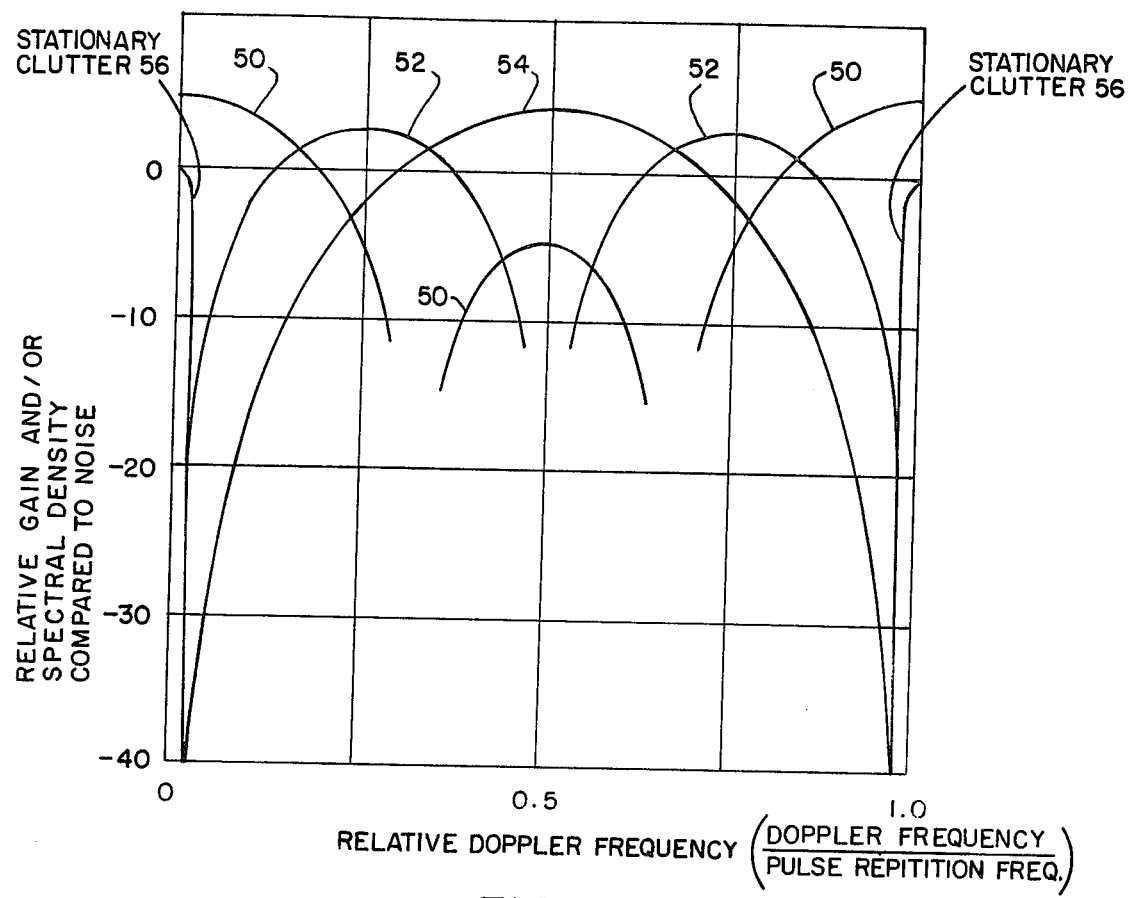
FIG. 3 is a graph illustrating the response of the filters of the invention to stationary ground clutter.

Referring now to FIGS. 1, 2 and 3, there is shown a three-pulse moving target detection system. Analog signal samples from an in-phase and quadrature phase (I and Q phase) detector 74 are sampled in samples 76 and fed to two 10 bit analog to digital (A/D) converters 80. The input (FIG. 1) video is sampled at 1/16 nmi and sent to the three-pulse MTD input (FIG. 1). The dynamic range of the video (noise level to limit level) is set to 50 dB, and all signals are preferably processed linearly over this range.

Each video input I and Q is processed in separate sections 70 and 110 of doppler filter 24 where three orthogonally weighted filters, 26, 28 and 30, are formed for I and 3 for Q. The video signal $f_1$ from filter 26, $f_2$ from filter 28 and $f_3$ from filter 30 at any sampling range are related to the A/D output signals by the following equations:

$$f_3 = a - 2b$$

$$f_2 = a - c$$

$$f_1 = a + b + c$$

where a,b,c represent the 3 sweeps within each batch.

The responses to doppler frequencies which result are shown in FIG. 3. Curve 50 shows the frequency response $F_1$ of filter 26, curve 52 shows the frequency response $F_2$ of filter 28 and curve 54 shows the frequency response $F_3$ of filter 30. Curve 56 shows a typical spectrum of stationary target radar clutter.

The I and Q doppler filter outputs are combined in each of the filters 26, 28 and 30 by conventional squaring, summing, and logging. The resultant magnitude expressed as an 8 bit logarithmic word is outputted as $F_1$, $F_2$ and $F_3$ from filters 26, 28 and 30. Subsequent processing is performed on these 8 bit digital words.

The zero doppler filter 26 ($F_1$) supplies a 65,536 cell adaptive clutter map storage 32. The clutter map resolution may be, for example, 1.40625° in azimuth (approximately the 3 dB radar antenna azimuth beamwidth) and 1/256 of the radar instrumented range. Accurate indexing of the clutter map azimuth to the PRF is not necessary, providing the radar transmits six or more pulses in the time the antenna rotates one 3 dB azimuth beamwidth.

The clutter map 32 which due to log magnitude storage has a wide dynamic range, then provides outputs for each range azimuth location which are the integrated value of $F_1$ output over several azimuth sweeps. The outputs are compared with preset thresholds in subtraction circuits 34, 36, and 38. The amount of each threshold is preferably adjusted to be equal to the expected improvement factor for each filter, 26, 28 and 30. Thus, for $F_1$, filter 26, there is no improvement so the threshold is zero and all the clutter map signals are subtracted from the output of filter 26 in circuit 34. For $F_2$, the subtraction circuit 36, which is fed by $F_2$, preferably has a threshold of approximately 20 dB since $F_2$, curve 52, intersects clutter curve 56 at this level. Similarly, the threshold of subtraction circuit 38 fed by $F_3$ is set around 40 dB since $F_3$, curve 54, intersects clutter curve 56 at around 40 dB. Thus, in a stationary radar using this filter system, clutter due to stationary targets may be subtracted out of each of a plurality of different filter responses to the extent that this clutter obscures the expected improvement provided by the filter. This is accomplished by subtracting that portion of the stored clutter for each output sample from the filters 26, 28 and 30, which exceed the threshold setting for that filter response. Thus, false alarms passing conventional constant false alarm rate filters 40 due to clutter exceeding the filter clutter suppression capabilities are eliminated and the full receiver dynamic range becomes available.

Although ground clutter has been removed from the signals at this point, weather clutter may still be present at each filter output. The weather clutter strength in each filter output is determined by the doppler velocity of the weather itself, and by its actual velocity with respect to the radar. If the weather is very slow moving, then the clutter map will remove it from the $F_1$ filter, but not the $F_2$ or $F_3$ filter, if the weather has sufficient doppler velocity.

To reduce weather clutter, each threshold filter output is passed through an averaging (range only) CFAR filter 40 which uses the average of the greatest of 8 cells on either side of the mid cell as an estimate of the local noise background.

The CFAR filters 40 have low loss and can remain permanently in the signal path. This has the advantage that in addition to reducing the weather clutter to noise level, the CFAR filters also tend to normalize any variations in the noise baseline caused by the clutter map thresholding the doppler filter outputs.

The output averages of the CFAR filters 40 are used by the weather contour circuit 42 to produce two levels of weather contours.

An interference editor 44 controls false alarms due to interference and saturation limiting clutter. It measures the sweep-to-sweep amplitude modulation of each return in each range cell in each group. If the amplitude variation exceeds the expected antenna scanning modulation, whether it is single pulse or limiting clutter, the signal at that range is blanked in that group.

The three doppler filter outputs ($F_1$, $F_2$ and $F_3$), after being automatically normalized by the clutter map 32 and passed through separate CFAR filters 40, are merged into one signal in a combiner 46 and the resultant signal is anti-logged in a video integrator 48 to produce a linear 8 bit signal which is then integrated by recursive integrator 48 which integrates the returns from successive three pulse groups as determined by a conventional synchronizer (not shown). Since the integrator 48 is operated in a linear fashion, the output signal dynamic range for the 8 bit signal is about 30 dB.

The output of integrator 48 supplies a video regenerator 50 which repeats the processed video to raise its repetition frequency to a suitable value for display. Regenerator 50 supplies a d/a converter 52 whose output is a video signal supplied to intensity modulate a plan position indicator 54 in FIG. 2.

FIG. 2 shows radar equipment in which the processor invention of FIG. 1 is incorporated. A pulse transmitter 60 generates short radio frequency pulses which are directed by a circulator 62 to an antenna 64 which radiates them towards a target. The signals reflected from the target are received by antenna 64 and are directed by the circulator 62 into a receiver 66 which amplifies them and down-converts them to an intermediate frequency.

A reference oscillator 68 generates a continuous oscillation at the intermediate frequency whose phase is referenced to that of the transmitter. Such a system is well known and conventional.

The IF signal from the receiver 66 and the reference oscillation from the reference oscillator 68 pass into the in-phase section 70 of the processor where they are both applied to a phase detector 74. The output of the in-phase and quadrature-phase detectors 74 have amplitudes which follow that of the signal from the receiver, multiplied by the cosine and sine of the phase angle between the received signal and the referenced oscillator signal. The outputs of detector 74 are bipolar video signals which are passed to sampling circuits 76 where, at times indicated by a range clock 78, samples of the video signal are passed to analog-to-digital converters 80 which convert each sample into a digital word.

A sequence of the digital words from A/D converter 30 occurs during the interpulse period following a transmitter pulse and this sequence is stored in a first store 82 which may be a conventional memory for 10 bit bites (or words) such as a random access memory on a shift register. The sequence of the digital words occurring in the interpulse period following the second transmitter pulse is stored in a second store 84 which is similar to 82.

During the interpulse period following the last of the three transmitted pulses of the group, the digital words from the analog-to-digital converter 80 and from store 82 are fed to the weighting networks 86, 88 and 90 of velocity filter 24, $F_1$. Simultaneously, said digital words are fed respectively to weighting networks 92, 94 and 96 in velocity filter 24, $F_2$ and to weighting networks 98, 100 and 102 in velocity filter 24, $F_3$.

Weighting networks 86 through 102 provide weights to the digital words as follows:

86, 88, 90, 92, 98 and 102 are weighted +1
94 is weighted 0
96 is weighted −1
100 is weighted −2.

The digital word weighted by network 86 through 90 are summed in each velocity filter 24 in summing circuits 104, 106 and 108 respectively.

A quadrature phase section 110 has components 74 through 108 which are identical to those in in-phase section 70. Reference oscillator 68 supplies the phase detector in section 110 with a reference signal which is 90° phase shifted from the reference signal supplied to the section 70 phase detector. Hence, the $F_1$, $F_2$ and $F_3$ outputs of 112, 114 and 116 of section 110 are in quadrature to the outputs of summers 104, 106 and 108 respectively.

The filters 24 contain six sequencing circuits 12 for squaring each of the digital outputs 104 through 116. The respective paris of in-phase and out-of-phase $F_1$s, $F_2$s and $F_3$s are then summed in summers 114 whose digital outputs are logged to provide the digital outputs of filters 26, 28 and 30 which contain elements 82 through 114. The Video output contains elements 34 through 52 of FIG. 1.

In operation, the returns from a group of three radar pulses are processed coherently to produce three filtered outputs $F_1$, $F_2$ and $F_3$. For each three-pulse group processed, there is a single output from each of the three filters. The output from a zero doppler clutter map is subtracted from each of the three filter outputs above different predetermined threshold values for each filter to remove zero doppler return and to thus improve subclutter visibility. Groups containing interference or clutter entering saturation may be blanked by circuit 44.

Averaging of CFAR in the range coordinate normalizes the signal levels in each filter before they are summed. The CFAR normalizing signals are also used to produce weather contours.

The three doppler filter outputs are formed after the in-phase and quadrature-phase components of three transmitted pulses have been collected and the three returns for one range sample are summed using three different sets of weights. The filter weights are preferably orthogonal to one another so that output noises are uncorrelated. Output $F_3$ is identical to that of a conventional three-pulse group single filter Moving Target Indicator. Both the real and quadrature signal components are processed identically, producing three real channel outputs and three quadrature channel outputs for each group of three input pulses. These signals are rectified and combined to form a single output for each range sample.

The clutter map 32 consists of a leaky bucket 10 pulse integrator for each range-azimuth resolution cell in the radar's coverage. The clutter map stores signals in cells which are controlled by control codes from range clock 78 and by a standard azimuth encoder (not shown). Zero doppler returns are integrated for preferably about 1 beamwidth, of rotating antenna 64, and the integrated value is stored in the clutter map 32. This operation synchronizes the map to the antenna keeping the resolution cells on the map fixed in azimuth. The clutter map leaky bucket integrator sums $F_1$ 8 to 10 azimuth scans of antenna 64 for each cell of map 32. Map 32 then supplies the signal to be subtracted from the zero doppler channel. For any selected range gate and beam position, this signal preferably is the largest map value taken from the three by three grid of points about the cell of interest. This operation minimizes false alarms in the vicinity of large point clutter.

The map output is also compared with subclutter visibility thresholds, one for each doppler filter. When the map output is larger than the threshold, the difference between the map and the threshold is subtracted from the appropriate doppler channel. This operation provides a means of regulating the available subclutter visibility when radar stability has degraded.

The CFAR circuitry is a conventional range averaging CFAR. Range samples preceding and following the sample of interest are summed and the larger sum scaled and subtracted from the cell of interest to normalize its signal level. These CFAR circuits, which are used in each filter channel, may also be used to produce weather contours. Two levels of weather contours may be generated by comparing the largest of the three threshold signals to two fixed thresholds.

The particular circuit elements used herein may be simple weighting circuits and adders. Thus, inexpensive real time processing of radar signals can be achieved. With three pulse groups, several groups of pulses can hit every target using a high directivity radar antenna thereby improving azimuth accuracy with high definition and reasonable antenna rotation rates.

This completes the description of the embodiment of the invention illustrated herein. However, many modifications thereof will be apparent to persons skilled in the art without departing from the spirit and scope of the invention. For example, other filter weighting value could be used and storage structure could be used for digital words. Accordingly, it is intended that this invention be not limited to the particular details of the embodiments disclosed herein except as defined by the appended claims.

What is claimed is:

1. A radar system processor for detecting signals in the presence of clutter comprising:
    means for deriving signals from reflections of directively radiated groups of at least three radar pulses in which the interpulse periods in each group are equal;
    detector means for extracting components of received signals phase related to said pulses;
    means for sampling said components at intervals in time corresponding to ranges of reflections;
    means for storing the sequences of samples generated by said sampling means during said interpulse periods;
    a plurality of velocity filters;
    said filters having means for weighting each sequence of stored samples with weighting coefficients;
    at least some of said weighting coefficients being different for different velocity filters; and
    means for normalizing the outputs of different ones of said velocity filters as a function of said clutter passing through said different filters.

2. The combination of claim 1 wherein said clutter normalizing means comprises:
    means for integrating signals from said receiver for different ranges on successive pulses of an azimuth direction of a radar antenna and subtracting different amounts of said clutter from different filter outputs.

3. The combination in accordance with claim 1 wherein:
    samples of said clutter are stored as logarithmic functions of said samples.

4. The combination in accordance with claim 1 wherein:
    the outputs of said velocity filters are logarithmic functions of said samples.

5. The combination of claim 1 wherein:
    samples of both in-phase and quadrature phase components of said samples are stored and the sum of the squares of the velocity filtered in-phase and quadrature phase samples of each of said samples are produced.

6. The combination of claim 1 wherein:
    said means for storing said sequence of samples comprises means for digitizing said samples and storing summed outputs of said velocity filters during the final interpulse period of each group of three interpulse periods.

7. A radar system comprising:
    means for directively radiating groups of three radar pulses in which the interpulse periods in each group are equal and for receiving reflections of said pulses;
    means for extracting components of received signals phase related to said pulses;
    means for sampling said components at intervals which are a function of range;
    means for storing the sequences of said samples generated during sequential interpulse periods in said group;

a plurality of velocity filters;
each of said filters having means for weighting each sequence of stored samples with weighting coefficients;
at least some of said coefficients being different for different velocity filters; and
means for normalizing the outputs of said velocity filters as a function of signals passing through some of said filters.

8. A radar system comprising:
means for directively radiating groups of three radar pulses in which the interpulse periods in each group are equal and with each pulse in said group radiated substantially in the same direction;
means for extracting components of received signal phase related to said pulses in the presence of clutter;
means for sequentially sampling said components;
means for storing the sequences of said samples generated during sequential interpulse periods in said group;
a plurality of velocity filters;
means for weighting the outputs of said filters with different weighting coefficients; and
means for normalizing the outputs of different ones of said velocity filters as a function of said clutter passing through said different filters.

9. A radar system comprising:
means for deriving signals in the presence of clutter from directively radiated groups of three radar pulses in which the interpulse periods in each group are equal;
means for extracting components of received signals which are phase related to said radar pulses;
means for sampling said components at predetermined intervals;
means for storing the sequences of said samples generated during sequential interpulse periods in said group; and
a plurality of velocity filters;
each of said filters having means for weighting each sequence of stored samples with weighting coefficients, some of which are different for different velocity filters and for normalizing the outputs of different ones of said velocity filters as a function of the portions of said clutter which pass through said different filters; and
the outputs of said velocity filters being logarithmic functions of said samples.

10. A radar system processor comprising:
means for deriving reflected signals from groups of three radar pulses directively radiated substantially in the same direction;
means for extracting components of received signals phase related to said pulses and containing clutter;
means for sampling said components at predetermined intervals corresponding to predetermined ranges;
means for storing the sequences of said samples generated during sequential interpulse periods in each group;
a plurality of velocity filters;
each of said filters having means for weighting each sequence of stored samples with weighting coefficients;
means for normalizing the outputs of different ones of said velocity filters as a function of the portions of said clutter passing through said different filters;
means for integrating said signals on successive received pulses at different times from objects at different distances producing said reflected signals; and
means for subtracting different amounts of said stored clutter from different outputs of said filters.

11. A radar system comprising:
means for directively radiating a plurality of radar pulses;
means for receiving and processing reflected target and clutter echo signals of said radar pulses comprising a plurality of filters having different bandpass characteristics; and
means for normalizing the outputs of said filters as a function of a long term average of background clutter passing through one or more of said filters.

12. The radar system in accordance with claim 11 wherein:
said normalizing means comprises means for integrating said reflected echo signals for different ranges on successive pulses of an azimuth direction of the radiated pulses.

13. The radar system in accordance with claim 11 wherein:
said radiated pulses have substantially equal interpulse periods.

14. A radar system comprising:
means for deriving signals having a clutter portion from directively radiated groups of three or more radar pulses in which interpulse periods in each group are equal; and
means for extracting components of received signals which are phase related to said radar pulses through a plurality of different velocity filters each weighted with different coefficients and having outputs which are normalized as a function of a long term average of background clutter passing through one or more of said filters.

15. The radar system in accordance with claim 14 wherein:
the outputs of said filters are logarithmic functions of samples of said components.

* * * * *